United States Patent
Bank et al.

(10) Patent No.: US 10,914,602 B2
(45) Date of Patent: Feb. 9, 2021

(54) VERIFICATION OF A GENERATED ROUTE IN COMPUTER ASSISTED NAVIGATION

(71) Applicant: International Business Machines Corporation, Armonk, NY (US)

(72) Inventors: Judith H. Bank, Durham, NC (US); Lisa M. Bradley, Cary, NC (US); Lin Sun, Raleigh, NC (US); Chunhui Yang, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 15/954,577

(22) Filed: Apr. 16, 2018

(65) Prior Publication Data

US 2018/0238700 A1    Aug. 23, 2018

Related U.S. Application Data

(63) Continuation of application No. 12/650,827, filed on Dec. 31, 2009, now Pat. No. 9,945,681.

(51) Int. Cl.
  *G01C 21/00* (2006.01)
  *G01C 21/34* (2006.01)

(52) U.S. Cl.
  CPC ................ *G01C 21/3476* (2013.01)

(58) Field of Classification Search
  CPC .... G01C 21/3476; G01C 21/26; G01C 21/00; G01C 21/20; G09B 29/106; G01S 19/48
  USPC ....... 701/200, 201, 206, 209, 400, 408, 533, 701/411, 410, 467; 340/996
  See application file for complete search history.

(56) References Cited

U.S. PATENT DOCUMENTS

| | | | |
|---|---|---|---|
| 6,098,015 A | 8/2000 | Nimura | |
| 7,356,405 B1 | 4/2008 | Nesbit | |
| 9,945,681 B2* | 4/2018 | Bank | G01C 21/3476 |
| 2001/0047241 A1* | 11/2001 | Khavakh | G01C 21/3492 |
| | | | 701/410 |
| 2004/0039520 A1* | 2/2004 | Khavakh | G01C 21/3446 |
| | | | 701/411 |
| 2005/0222756 A1 | 10/2005 | Davis | |

(Continued)

FOREIGN PATENT DOCUMENTS

WO    2009065637 A1    5/2009

OTHER PUBLICATIONS

"GPS Route Creation Tutorial", J&A Accessories, <https://web.archive.org/web/20090907012715/http://www.goldwinggadgets.com/iWay/Route_Tutorial1.htm>, 2 pages, Wayback machine Sep. 7, 2009.

(Continued)

*Primary Examiner* — Shardul D Patel
(74) *Attorney, Agent, or Firm* — Nicholas A. Welling; Christopher M. Pignato

(57) ABSTRACT

An approach to validate a route generated by machine logic may be provided. The approach may include a user inputting an origin and destination. The approach may include generating a route from the user input by machine logic. The approach may additionally include the user inputting one or more waypoints. The approach may determine if the waypoint(s) is located on the generated route. If it is determined the waypoints are not on the generated route, a second route may be generated, by machine logic, with the waypoint(s) on the route. The approach may further include presenting the route to a user for validation.

12 Claims, 2 Drawing Sheets

(56) References Cited

U.S. PATENT DOCUMENTS

| | | | |
|---|---|---|---|
| 2006/0100941 A1* | 5/2006 | Mariotti | G06Q 10/087 705/28 |
| 2007/0156333 A1 | 7/2007 | McBride | |
| 2008/0154489 A1* | 6/2008 | Kaneda | G01C 21/3415 701/533 |
| 2008/0262717 A1* | 10/2008 | Ettinger | G01C 21/3644 701/467 |
| 2008/0319658 A1* | 12/2008 | Horvitz | G01C 21/3644 701/414 |
| 2009/0005965 A1 | 1/2009 | Forstall | |
| 2010/0026526 A1* | 2/2010 | Yokota | G08G 1/096838 340/996 |
| 2011/0046883 A1* | 2/2011 | Ross | G01C 21/005 701/533 |
| 2011/0160999 A1 | 6/2011 | Bank | |

OTHER PUBLICATIONS

"GPS Waypoint Registry", Waypoint, <https://web.archive.org/web/20090814030640/http://www.waypoint.org:80/>, 2 pages, Wayback machine dated Aug. 14, 2009.

"Send MapQuest, Google Maps Directions from Garmin", Mar 31, 2008, 9 pages, <http://www.gpsreview.net/send-mapquest-directions-to-garmin/>.

Patel et al., "Personalizing Routes", UIST'06, Oct. 15-18, 2006, Montreux, Switzerland, 4 pages.

* cited by examiner

VERIFICATION OF A GENERATED ROUTE IN COMPUTER ASSISTED NAVIGATION

CROSS-REFERENCE TO RELATED APPLICATIONS

This application is a Continuation of U.S. patent application Ser. No. 12/650,827, filed on Dec. 31, 2009, the entirety of which is herein incorporated by reference.

BACKGROUND OF THE INVENTION

Field of the Invention

The present invention relates to route generation in a computer assisted navigation system and more particularly to route selection for a selected destination in a computer assisted navigation system.

Description of the Related Art

Computer assisted navigation has evolved substantially over the past half-century from a technology accessible only by governments and large institutions, to a technology accessible by ordinary people at a price comparable to a personal camera. Consequently, at present computer assisted navigation can be found embedded in private vehicles, and also as a stand-alone device coupled to a global positioning system (GPS) receiver. In complement to dedicated computer assisted navigation systems, and in many cases, as included as part of dedicated computer assisted navigation systems, software mapping systems have become a staple of personal computing and provide a degree of convenience in traveling for ordinary people not typical of just a few years ago.

Software mapping systems often are accessed from over the global Internet through a Web browser. Software mapping systems provide two essential functions. First, software mapping systems generate a map for a location—typically provided in the form of an address. Second, software mapping systems generate a route and corresponding textual directions to one destination from one origination. In many cases, a link embedded in content accessible over the World Wide Web can invoke a remote software mapping system to generate a route to a pre-specified destination associated with the content from a dynamically specified origin. In this way, end users interacting with the content associated with a destination can receive directions to the destination through the content from a dynamically specified origin.

Modern software mapping systems, whether included as part of a computer assisted navigation device, deployed as a stand-alone computer program, or rendered accessible over a network such as the Internet, permit the generation of multiple different routes to a specified destination from a specified location. The different generated routes can vary according to user preference such as the minimization of highways, the shortest route by distance or time, or the desire to avoid toll roads. As software mapping systems are only as reliable as the underlying mapping data, in many cases one route can be accurate while another may not be accurate. Many users will attest the frustration of not knowing which of several generated routes to select when plotting a course for a destination.

To facilitate route selection, many commercially available software mapping systems permitting the setting of waypoints. A waypoint is a location in a route viewed as an intermediate destination that must be reached en route to a final destination. By setting forth multiple different waypoints, an end user can plot a personalized route to a final destination. Even still, the use of waypoints in customizing a generated route presupposes the knowledge of the waypoints by the end user in plotting a course to a final destination. In many cases, however, end users are unfamiliar with the route to a desired destination and, as such, cannot specify waypoints.

BRIEF SUMMARY OF THE INVENTION

Embodiments of the present invention address deficiencies of the art in respect to route selection in a mapping system and provide a novel and non-obvious method, system and computer program product for verification of a generated route in computer assisted navigation. In an embodiment of the invention, a method for verification of a generated route in computer assisted navigation is provided. The method includes receiving an origin and a destination in a mapping application executing in memory by a processor of a computer and generating a first route in the mapping application from the origin to the destination. The method also includes receiving a waypoint for the first route and determining whether or not the waypoint is proximate to the first route. Finally, the method includes validating the first route only if it is determined that the waypoint is proximate to the first route. In one aspect of the embodiment, the method also can include generating an alternative route to include the waypoint if it is determined that the waypoint is not proximate to the first route.

In another embodiment of the invention, a computer assisted navigation data processing system is provided. The system can include a computer with processor and memory, an operating system executing in the computer, a mapping application hosted by the operating system, and a route validation module coupled to the mapping application. The module includes program code enabled to receive a waypoint for a first route from an origin to a destination generated by the mapping application, to determine whether or not the waypoint is proximate to the first route, and to validate the first route only if it is determined that the waypoint is proximate to the first route. Optionally, the program code is further enabled to generate an alternative route to include the waypoint if it is determined that the waypoint is not proximate to the first route. A global positioning system (GPS) receiver can be include to provide the origin to the mapping application, and as another option, the computer, operating system, mapping application, route validation module and GPS receiver can be included as a single computer assisted navigation device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for verification of a generated route in computer assisted navigation. In accordance with an embodiment of the invention, a route can be generated for a specified destination in a mapping system. A specified waypoint can be compared to the generated route to determine whether the waypoint exists along the generated route. If it is determined that the waypoint exists along the generated route, the route can be verified and a confirmation can be generated for viewing through a user interface to the mapping system. Optionally, if it is determined that the waypoint does not exist along the generated route, a prompt can be displayed through the user interface indicating that the waypoint does not exist along the generated route. Optionally, a new route can be generated to the specified destination that includes the specified waypoint.

Figure 1:
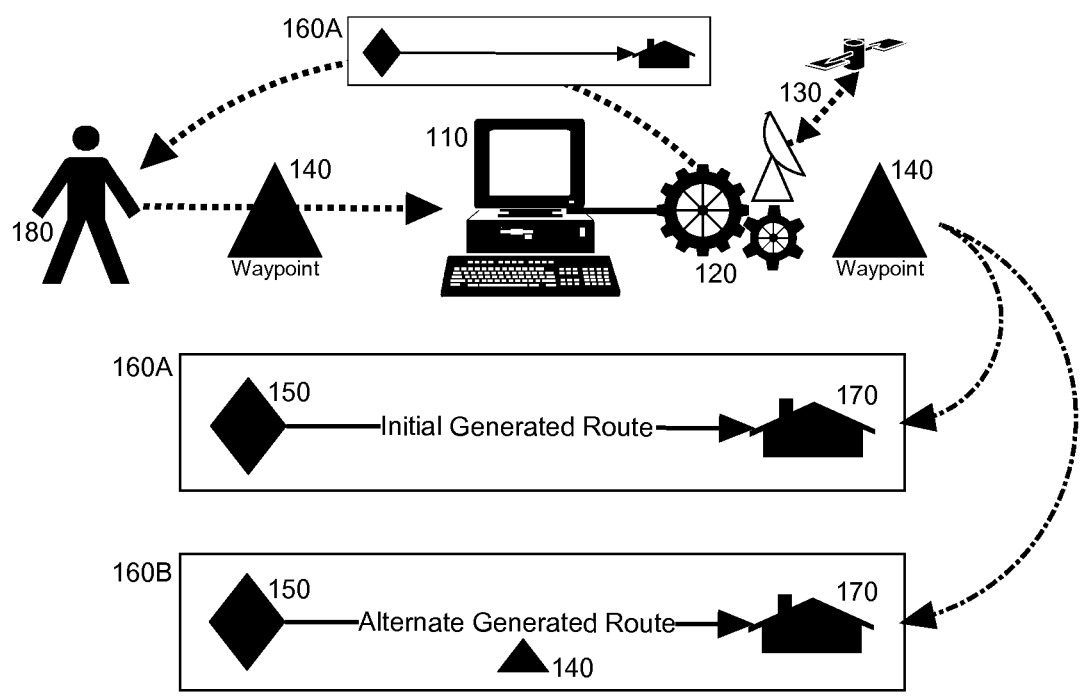
FIG. 1 is pictorial illustration of a process for verification of a generated route in computer assisted navigation.

In further illustration, FIG. 1 pictorially illustrates a process for verification of a generated route in computer-assisted navigation. As shown in FIG. 1, software mapping system 120 in a computer assisted navigation device 110 can generate an initial route 160A based upon a supplied origin 150 and destination 170. Optionally, the origin 150 can be computed through GPS locator 130. The initial route 160A can be provided to the end user 180 for review and a known waypoint 140 can be returned to the mapping system 120 to determine whether or not the waypoint 140 can be found along the initial route 160A. In this regard, the waypoint 140 can be provided by the end user 180, or by a third party familiar with the desired route to the destination 170. In either case, if the waypoint 140 is found along the initial route 160A, the initial route 160A can be validated as correct. Otherwise, an alternative route 160B from the origin 150 to the destination 170 can be generated to include the waypoint 140.

Figure 2:
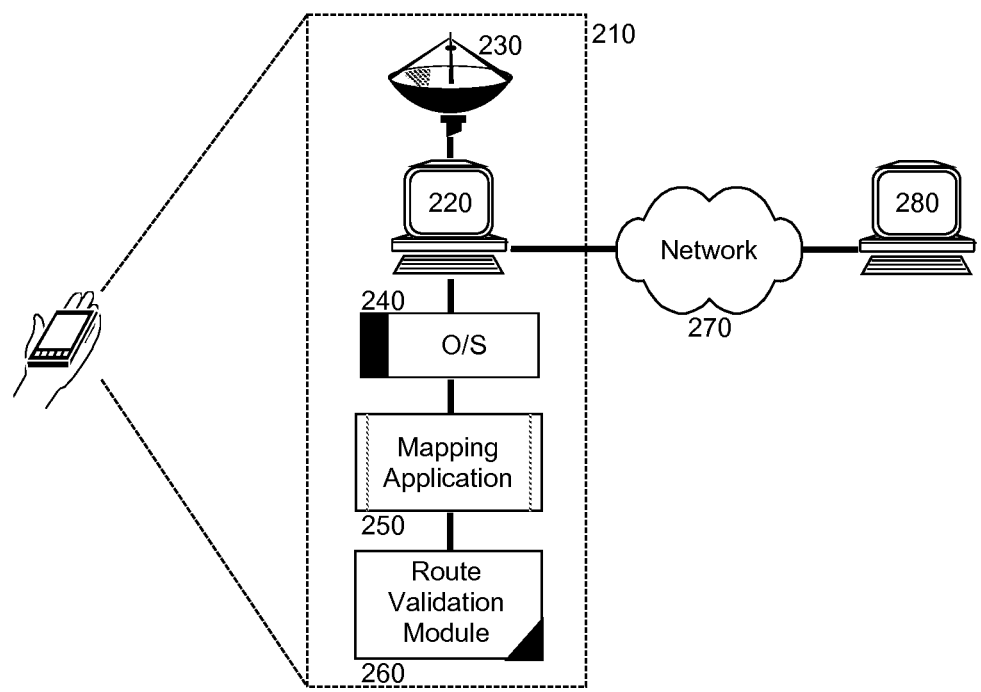
FIG. 2 is a schematic illustration of a computer assisted navigation system configured for verification of a generated route; and, FIG. 3 is a flow chart illustrating a process for verification of a generated route in computer assisted navigation.

The process described in connection with FIG. 1 can be implemented in a computer assisted navigation system. In yet further illustration, FIG. 2 schematically shows a computer assisted navigation system configured for verification of a generated route. The system can include a computer assisted navigation device 210, such as a handheld navigation device, embedded vehicular navigation device, or even a general purpose computer configured with a mapping system. By way of example, the computer assisted navigation device 210 can include a computer 220 with processor and memory supporting the execution of an operating system 240 hosting the operation of a mapping application 250. The mapping application 250 can be configured to generate different alternative routes between an origin and a specified destination as provided by an end user. Further, the mapping application 250 can be configured when coupled to a GPS receiver 230 to generate the different alternative routes between an origin determined by the GPS receiver 230 and a specified destination.

Of note, a route validation module 260 can be coupled to the mapping application 250 and can execute in the memory of the computer 220. Alternatively, the route validation module 260 can execute in the memory of a different computer (not shown), but can be communicatively linked to the mapping application 250. The route validation module 260 can include program code that when executed by the processor of the computer 220 (or any other computer) can receive a waypoint for a generated route and can determine whether or not the waypoint can be found in proximity to any point in the generated route. Optionally, the waypoint can be received from another computer 280 from over a computer communications network 270. If so, the program code of the route validation module 260 can provide an indication that the generated route is valid. Otherwise, the program code of the route validation module 260 can provide an indication that the generated route is not valid. Additionally, the program code of the route validation module 260 can direct the generation of an alternative route that includes the received waypoint.

Figure 3:
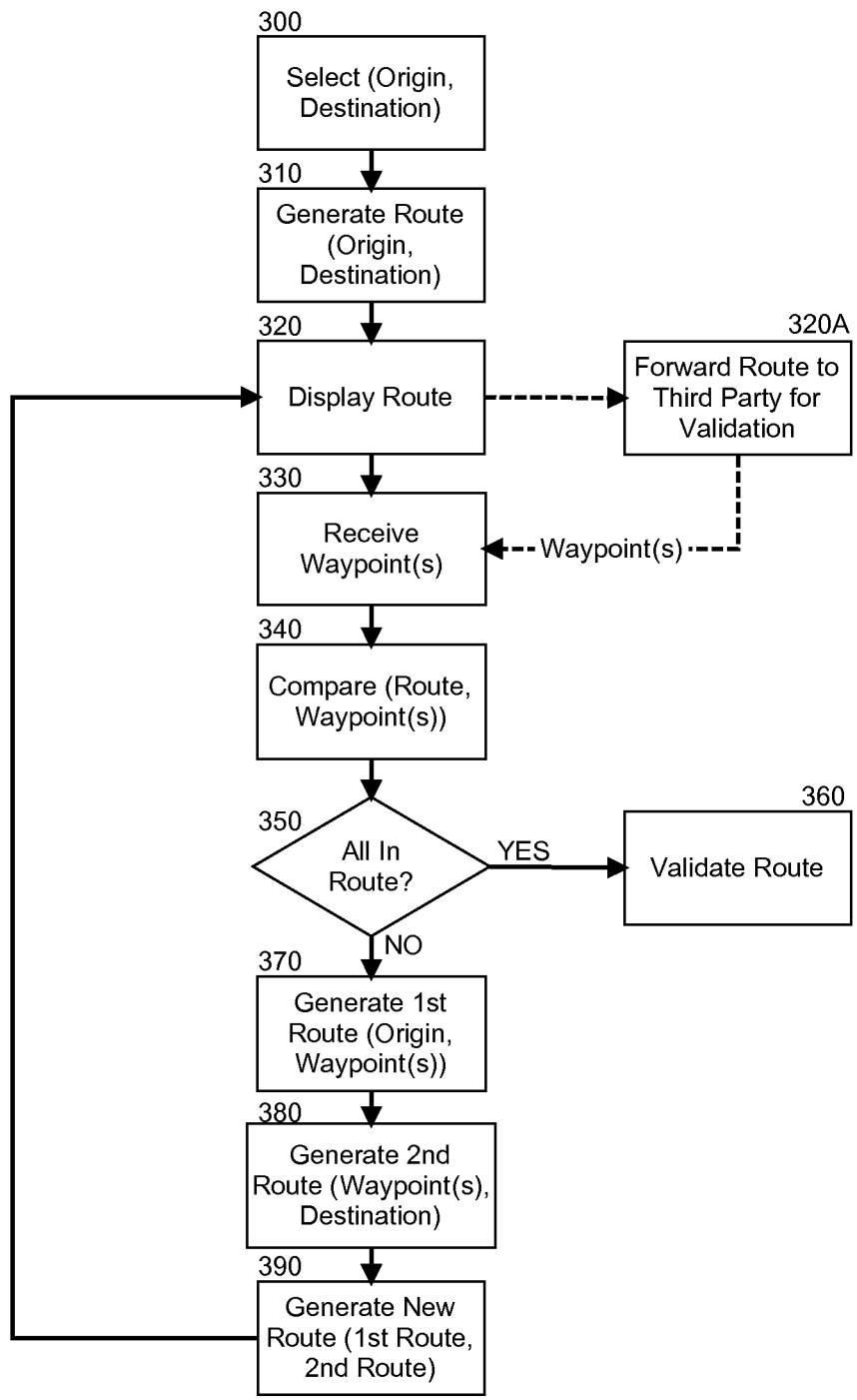

In even yet further illustration of the operation of the route validation module 260, FIG. 3 is a flow chart illustrating a process for verification of a generated route in computer assisted navigation. Beginning in block 300, an origin and destination can be selected and in block 310, a route can be generated for the origin and destination. In block 320, the route can be displayed through a user interface such as a Web browser or a that of a GPS navigation device. Optionally, in block 320A the route can be transmitted to a third party over a computer communications network, such as by electronic mail. In block 330, at least one waypoint (and optionally multiple waypoints) can be received and in block 340, a comparison can be made of the waypoint (or multiple waypoints) and the generated route to determine in decision block 350 whether or not the waypoint (or multiple waypoints) is proximate to and can be found along the generated route. If so, in block 360 the route can be validated. If not, the process can continue through block 370.

In block 370, a first route can be generated as between the origin and the waypoint. Likewise, in block 380 a second route can be generated as between the waypoint and the destination (though it will be apparent to the skilled artisan that multiple additional routes can be generated between waypoints in the event that multiple waypoints are provided. Thereafter, in block 390 the different routes can be combined into a single new route and displayed in block 320 as an alternative route including the waypoint (or waypoints) as the case may be.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising: receiving, by a processor, an origin from a global positioning system (GPS) navigation device; generating, by machine logic, a first suggested route over a plurality of roads, with the suggested route traversing from the origin established by the GPS navigation device to a destination; receiving user input indicative of a set of waypoints that respectively correspond to an identifiable location; determining, by machine logic, that at least one waypoint of the set of waypoints is not proximate to the first suggested route; and responsive to the determination that at least one waypoint of the set of waypoints is not proximate to the first suggested route, generating, by machine logic, a second suggested route from the origin to the destination, with the second suggested route being proximate to all waypoints of the set waypoint(s).

2. The method of claim 1, further comprising:
outputting the second suggested route in human understandable form and format.

3. The method of claim 1, wherein receiving the user input comprises receiving the user input from an end user associated with the destination from over a computer communications network.

4. The method of claim 1, further comprising transmitting the second suggested route to an end user over the computer communications network.

5. A computer program product comprising a non-transitory computer usable medium embodying computer usable program code for verification of a generated route in computer assisted navigation, the computer program product, wherein the computer usable program code during execution by a processor of a computer performs: receiving an origin from a global positioning system (GPS) navigation device; generating, by machine logic, a first suggested route over a plurality of roads, with the suggested route traversing from an origin established by a GPS navigation device to a destination; receiving user input indicated of a set of waypoints that respectively correspond to an identifiable location; determining, by machine logic, that at least one waypoint of the set of waypoints is not proximate to the first suggested route; and responsive to the determination that at least one waypoint of the set of waypoints is not proximate to the first suggested route, generating, by machine logic, a second suggested route from the origin to the destination, with the second suggested route being proximate to all waypoints of the set of waypoint(s).

6. The computer program product of claim 5, further comprising:
outputting the second suggested route in human understandable form and format.

7. The computer program product of claim 5, wherein receiving the user input comprises receiving the user input from an end user associated with the destination from over a computer communications network.

8. The computer program product of claim 5, further comprising transmitting the second suggested route to an end user over the computer communications network.

9. A computer assisted navigation data processing system comprising: a computer with processor and memory; an operating system executing in the computer; a mapping application hosted by the operating system; and, a route validation module coupled to the mapping application, the module comprising program code enabled to perform: receive an origin from a global positioning system (GPS) navigation device; generating, by machine logic, a first suggested route over a plurality of roads, with the suggested route traversing from an origin established by a GPS navigation device to a destination; receiving user input indicative of a set of waypoints that respectively correspond to an identifiable location; determining, by machine logic, that at least one waypoint of the set of waypoints is not proximate to the first suggested route; and responsive to the determination that at least one waypoint of the set of waypoints is not proximate to the first suggested route, generating, by machine logic, a second suggested route from the origin to the destination, with the second suggested route being proximate to all waypoints of the set waypoint(s).

10. The system of claim 9, further comprising:
outputting the second suggested route in human understandable form and format.

11. The system of claim 9, wherein receiving the user input comprises receiving the user input from an end user associated with the destination from over a computer communications network.

12. The system of claim 9, further comprising transmitting the second suggested route to an end user over the computer communications network.

* * * * *